(12) United States Patent
Zhao et al.

(10) Patent No.: US 8,764,574 B2
(45) Date of Patent: Jul. 1, 2014

(54) COUPLING

(71) Applicant: Johnson Electric S.A., Murten (CH)

(72) Inventors: Kai Zhao, Shenzhen (CN); Jin An Nie, Shenzhen (CN)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 13/656,243

(22) Filed: Oct. 19, 2012

(65) Prior Publication Data

US 2013/0102396 A1    Apr. 25, 2013

(30) Foreign Application Priority Data

Oct. 20, 2011  (CN) .......................... 2011 1 0321067

(51) Int. Cl.
*F16D 3/68* (2006.01)

(52) U.S. Cl.
USPC .................. 464/75; 464/76; 464/158

(58) Field of Classification Search
USPC ............ 464/74–76, 111, 158, 159; 123/192.1
See application file for complete search history.

(56) References Cited

U.S. PATENT DOCUMENTS

| | | | | |
|---|---|---|---|---|
| 1,274,254 A | * | 7/1918 | Fleek | 464/158 |
| 3,293,883 A | * | 12/1966 | Boschi et al. | 464/74 |
| 4,327,562 A | * | 5/1982 | Gottschalk | 464/75 |
| 4,355,990 A | * | 10/1982 | Duncan, Jr. | 464/74 X |
| 6,343,992 B2 | * | 2/2002 | Korus | 464/74 |
| 7,670,228 B2 | | 3/2010 | Matsumoto et al. | |

FOREIGN PATENT DOCUMENTS

GB    2 078 340 A  *  1/1982 ....................... 464/75

* cited by examiner

*Primary Examiner* — Gregory Binda
(74) *Attorney, Agent, or Firm* — Muncy, Geissler, Olds & Lowe, P.C.

(57) ABSTRACT

A torque transmission assembly has a first shaft, a second shaft, and a coupling device. The coupling device includes a first coupling member rotating with the first shaft, and a second coupling member fixed with the second shaft. The first coupling member includes a bottom wall having a mounting face, and a plurality of arms extending axially from the mounting face. The arms are circumferentially spaced from each other with a receiving space defined between each two neighboring arms. The second coupling member includes a main body and a plurality of spaced arms extending radially from an outer periphery of the main body. Each of the arms of the second coupling member is received in a respective receiving space of the first coupling member, thus the first coupling member rotates with the second coupling member.

22 Claims, 4 Drawing Sheets

COUPLING

CROSS REFERENCE TO RELATED APPLICATIONS

This non-provisional patent application claims priority under 35 U.S.C. §119(a) from Patent Application No. 201110321067.1 filed in The People's Republic of China on Oct. 20, 2011.

FIELD OF THE INVENTION

This invention relates to a torque transmission assembly, and in particular, to a coupling device for connecting a driven shaft to a driving shaft.

BACKGROUND OF THE INVENTION

A torque transmission assembly includes a driving shaft, a driven shaft, and a coupler to connect the driving shaft to the driven shaft, such that the driven shaft rotates together with the driving shaft. The coupler typically includes a first coupling member and a second coupling member. The first coupling member includes a base to be connected with the driving shaft, and a plurality of arms extending axially from the base. The arms of the first coupling member are spaced with a gap formed between each two neighboring arms. The second coupling member includes a base to be connected with the driven shaft, and a plurality of arms extending axially from the base.

When assembled, the arms of the second coupling member are received in the gaps of the first coupling member and abut against the arms of the first coupling member in a circumferential direction of the coupler. Therefore, torque can be transmitted from the driving shaft to the driven shaft by the coupler. However, the first coupling member and the second coupling member both have a base which adds length to the coupler. As a result, it is difficult to miniaturize the torque transmission assembly.

Therefore, there is a desire for an improved coupling device that can overcome the above described shortcomings.

SUMMARY OF THE INVENTION

Accordingly, in one aspect thereof, the present invention provides a coupling device configured for connecting a first shaft to a second shaft, the coupling device comprising: a first coupling member comprising a bottom wall having a mounting face at an axial end, and a plurality of arms extending axially from the mounting face of the bottom wall, the arms being circumferentially spaced from each other with a receiving space defined between each two neighboring arms; and a second coupling member comprising a main body and a plurality of arms extending radially from an outer periphery of the main body, the arms of the second coupling member being circumferentially spaced from each other, each of the arms of the second coupling member being received in a respective receiving space of the first coupling member, whereby the first coupling member and the second coupling member rotate together.

Preferably, the first coupling member further comprises a cylindrical sidewall extending axially from a periphery of the bottom wall, and a radially outer end of each arm of the first coupling member adjoins an inner surface of the sidewall.

Preferably, the second coupling member is entirely received in the first coupling member.

Preferably, a damper is provided, having a plurality of buffering blocks each of which is disposed between a respective arm of the first coupling member and a corresponding arm of the second coupling member adjacent to the arm of the first coupling member.

Preferably, the first coupling member and the damper are joined together by insert molding.

Preferably, the first coupling member and the damper form interlocking structures at interfaces between the arms of the first coupling member and the buffering blocks of the damper, each interlocking structure comprises a groove and a protrusion fittingly engaged in the groove.

Preferably, the protrusions of the interlocking structure are wedge shaped, and the grooves have a corresponding wedge shaped profile.

Preferably, the first coupling member defines an annular groove in an axially outer end surface of the bottom wall, the annular groove being connected to the receiving spaces of the first coupling member by through holes formed in the end wall, and the damper comprises a bottom ring fittingly received in the annular groove.

According to a second aspect thereof, the present invention provides a torque transmission assembly comprising: a first shaft; a second shaft; and a coupling device for connecting the first shaft to the second shaft, the coupling device comprising: a first coupling member fixed to rotate with the first shaft, the first coupling member comprising a bottom wall having a mounting face at an axial end, and a plurality of arms extending axially from the mounting face of the bottom wall, the arms being circumferentially spaced from each other with a receiving space defined between each two neighboring arms; and a second coupling member arranged to rotate with the second shaft, the second coupling member comprising a main body and a plurality of arms extending radially from an outer periphery of the main body, the arms of the second coupling member being circumferentially spaced from each other, each of the arms of the second coupling member being received in a respective receiving space of the first coupling member, whereby the first coupling member and the second coupling member rotate together.

Preferably, the first coupling member is integrally formed on the first shaft by insert molding.

Preferably, a plurality of teeth are formed at an interface between the first coupling member and the first shaft.

Preferably, the first coupling member further comprises a cylindrical sidewall extending axially from a periphery of the bottom wall, and a radially outer end of each arm of the first coupling member adjoins an inner surface of the sidewall.

Preferably, the second coupling member is entirely received in the first coupling member.

Preferably, the coupling device further comprises a damper, the damper comprises a plurality of buffering blocks each of which is disposed between a respective arm of the first coupling member and a corresponding arm of the second coupling member adjacent to the arm of the first coupling member.

Preferably, the damper is molded to the first coupling member.

Preferably, the first coupling member and the damper form interlocking structures at interfaces between the arms of the first coupling member and the buffering blocks of the damper, each interlocking structure comprises a groove and a protrusion fittingly engaged with the groove.

Preferably, the protrusions of the interlocking structures are wedge shaped, and the grooves have a corresponding wedge shaped profile.

Preferably, the first coupling member defines an annular groove in an axially outer end surface of the bottom wall, the annular groove being connected to the receiving spaces of the first coupling member by through holes formed in the end wall, and the damper comprises a bottom ring fittingly received in the annular groove.

Preferably, a thrust force transmitting member is provided and the first shaft has a blind hole, the thrust force transmitting member being received in the blind hole with an axial end thereof abutting against a bottom of the blind hole, and an axial end of the second shaft extends through the second coupling member and abuts against an opposite axial end of the thrust force transmitting member.

BRIEF DESCRIPTION OF THE DRAWINGS

Preferred embodiments of the invention will now be described, by way of examples only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
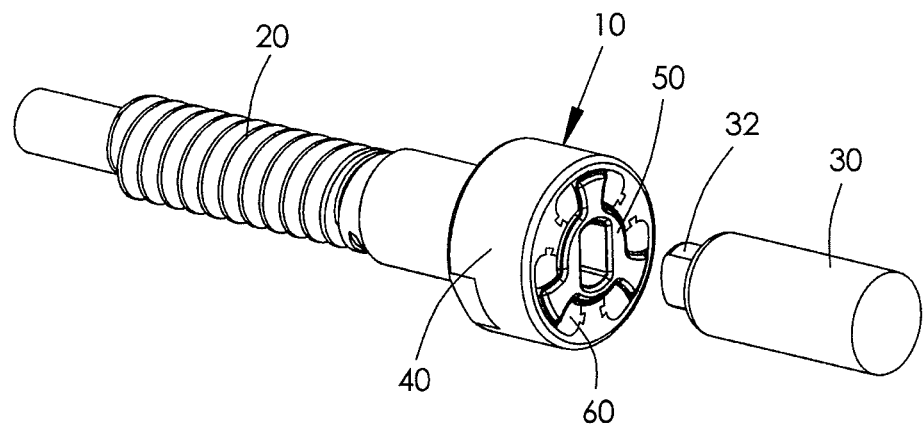
FIG. 1 is a partially assembled view of a toque transmission assembly according to a first embodiment of the present invention, showing an assembled coupling device.
Figure 2:
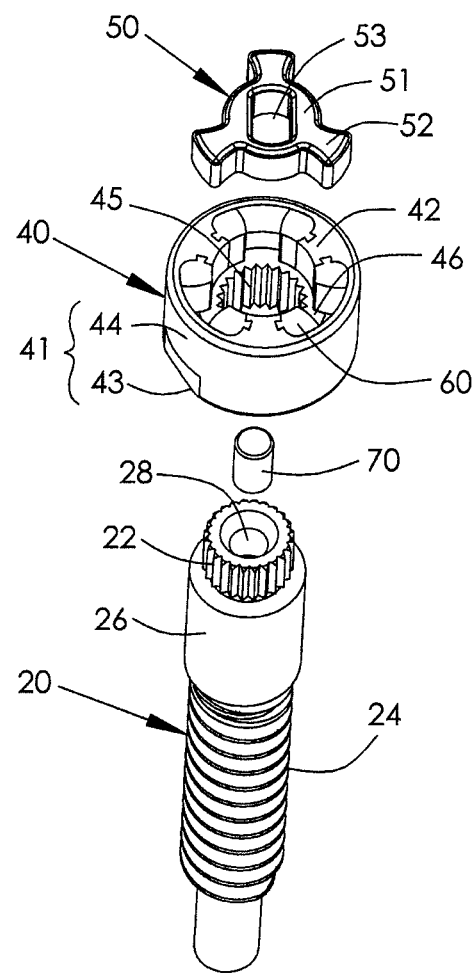
FIG. 2 is an exploded view of the torque transmission assembly of FIG. 1, with an input shaft removed.

Referring to FIGS. 1 and 2, a coupling device 10 according to a first embodiment of the present invention is shown. The coupling device 10 is configured to connect an output shaft 20 to an input shaft 30 coaxially, such that the output shaft 20 rotates with the input shaft 30. The input shaft 30 is usually a motor shaft. The output shaft 20 is connected to a device so as to drive the device. The assembled coupling device 10, input shaft 20 and output shaft 30 cooperatively form a torque transmission assembly.

The input shaft 30 has a mounting portion 32 formed at one axial end thereof to connect with the coupling device 10. The mounting portion 32 has a rectangular transverse cross section.

The output shaft 20 is substantially cylindrical. The output shaft 20 includes, along its axial direction, a connecting section 22 at one axial end, a threaded section 24 at an intermediate portion, and a stop section 26 extending between the connecting section 22 and the threaded section 24. The stop section 26 has a diameter larger than each of the connecting section 22 and the threaded section 24. The threaded section 24 has a helical thread formed at an outer periphery for meshing with teeth of a gear, so as to drive the gear. For example the threaded section may form a worm that in use meshes with a worm gear. The connecting section 22 has a plurality of parallel teeth on an outer periphery thereof, which extend in the axial direction of the output shaft 20. The connecting section 22 has a blind hole 28 therein which has an opening in the axial end of the output shaft 20.

The coupling device 10 includes a first coupling member 40 connected to the output shaft 20, a second coupling member 50 connected to the input shaft 30, a damper 60 disposed between the first coupling member 40 and the second coupling member 50, and a thrust force transmitting member 70.

Figure 3:
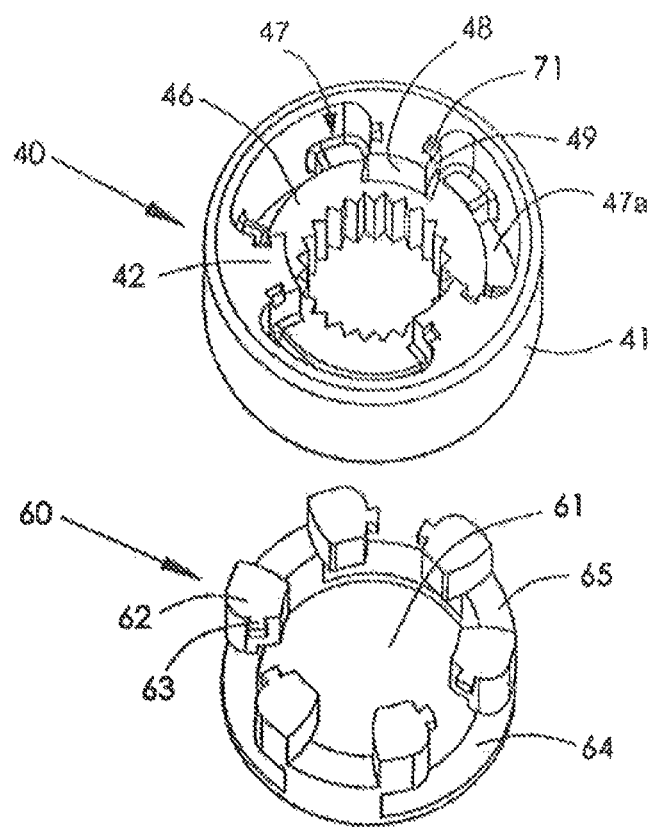
FIG. 3 is an exploded view of a first coupling member and a damper of the coupling device of FIG. 2.

Referring also to FIG. 3, the first coupling member 40 includes a hub 41 and a plurality of arms 42 extending integrally from the hub 41. That is, the hub 41 and the arms 42 are formed as a monolithic construction. In this preferred embodiment, the first coupling member 40 is made of plastic by injection molding.

The hub 41 includes a bottom wall 43 and a ring-shaped sidewall 44 extending axially from a circumference of one axial end surface of the bottom wall 43. The bottom wall 43 is substantially cylindrical with a fixing hole 45 defined at a central portion. The bottom wall 43 has a plurality of teeth disposed at a periphery of the fixing hole 45. The teeth are parallel and extend axially to mesh with the teeth of the connecting section 22 of the output shaft 20, such that the first coupling member 40 rotates with the output shaft 20 after being assembled. In this embodiment, the hub 41 is directly formed on the output shaft 20 by insert molding.

The bottom wall 43 of the hub 41 includes a mounting face 46 located within the sidewall. The arms 42 each extend axially from the mounting face 46. A radially inner end of each arm is located outside of the periphery of the fixing hole 45 of the bottom wall 43. A radially outer end of each arm 42 adjoins an inner surface of the sidewall 44. The arms 42 are equal spaced circumferentially about the sidewall 44. In this embodiment, there are three arms 42 which are located at 120° intervals. A receiving space 47 is formed between every two neighboring arms 42. The receiving spaces 47 connect with holes 47a that extend axially through the bottom wall 43.

The damper 60 is received in the first coupling member 40. The damper 60 is made of elastic material, such as rubber or other elastomeric material. The damper 60 defines a central hole 61 and includes a plurality of pairs of buffering blocks 62 arranged around the central hole 61. The buffering blocks 62 are spaced and arranged along a circumference of the damper 60. Each pair of buffering blocks 62 sandwiches an arm 42 of the first coupling member 40 there between. Each arm 42 of the first coupling member 40 includes a curved radially innermost surface 48 and a pair of side surfaces 49 to connect two circumferential ends of the radially innermost surface 48 to the inner surface of the sidewall 44. Preferably, each side surface 49 of the arm 42 has a groove 71 therein, and each buffering block 62 of the damper 60 forms a protrusion 63 having a shape matching the groove 71 of the arms 42, such that the protrusions 63 of the buffering blocks 62 can fittingly engage the grooves 71 to enhance a connection strength between the damper 60 and the first coupling member 40.

The damper 60 may be detachably received in the first coupling member 40, but in this embodiment, the damper 60 and the first coupling member 40 are preferably integrally formed by insert molding. In other words, the damper 60 is preferably integrally formed on the first coupling member 40 by injection molding. The grooves 71 of the arms 42 of the first coupling member 40 are wedge shaped, and the protrusions 63 of the buffering blocks of the damper 60 have a corresponding wedge shape, such that the connection strength between the first coupling member 40 and the damper 60 is increased.

Figure 4:
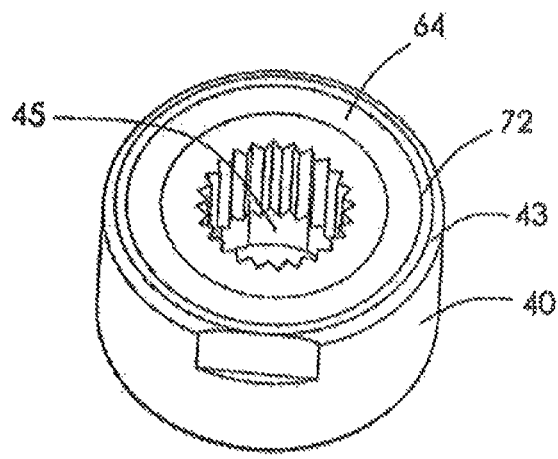
FIG. 4 is an assembled view of the first coupling device and the damper of FIG. 3, viewed from below.
Figure 6:
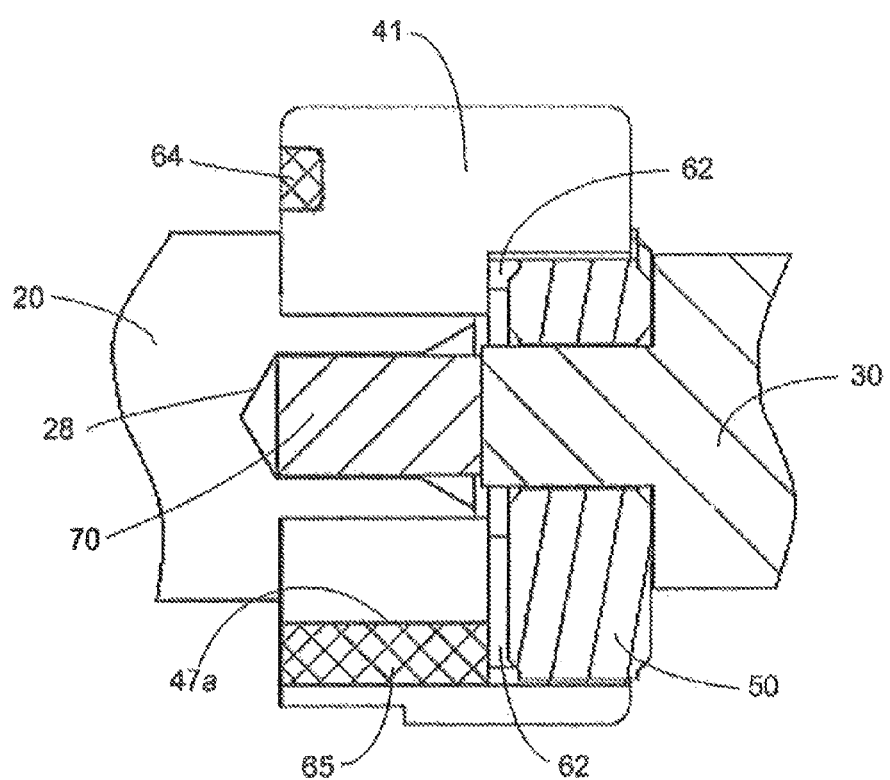
FIG. 6 is a partial view of a cross section of FIG. 1, with the input shaft 30 assembled into the coupling device.

Referring also to FIGS. 4 and 6, the damper 60 includes a bottom ring 64 connecting the buffering blocks 62 together.

The first coupling member 40 defines an annular groove 72 in the axially outer end surface of the bottom wall 43 to receive the bottom ring 64 of the damper 60. The annular groove 72 connects with the spaces 47 between the arms 42 via the holes 47a. The damper 60 includes a plurality of connecting bars 65 each of with is received in a respective hole between the annular groove 72 and the spaces 47 of the first coupling member 40. Each connecting bar 65 connects two adjacent buffering blocks 62 of two neighboring pairs together.

Referring back to FIG. 2, the second coupling member 50 includes a main body 51 and a plurality of arms 52 integrally formed on the main body 51, as a monolithic construction. The main body 51 is substantially cylindrical and the arms 52 extend substantially radially from an outer periphery of the main body 51. The arms 52 are equal spaced circumferentially about the main body 51. The main body 51 has a mounting hole 53 there through for mounting the input shaft 30. The mounting hole 53 has a profile corresponding to that of the mounting portion 32 of the input shaft 30, so as to fittingly receive the mounting portion 32 therein, such that the second coupling member 50 rotates with the input shaft 30 after being assembled together.

During assembly of the coupling device 10, the second coupling member 50 is received in the first coupling member 40. The main body 51 of the second coupling member 50 is disposed in a central area of the first coupling member 40, and the radially innermost surfaces 48 of the arms 42 of the first coupling member 40 abut against the outer periphery of the main body 51 of the second coupling member 50, such that the second coupling member 50 is radially restricted in place. Each arm 52 of the second coupling member 50 is received in a respective space 47 of the first coupling device 40. As a result, the arms 42 of the first coupling member 40 and the arms 52 of the second coupling member 50 are arranged alternately in the circumferential direction of the coupling device 10. Each buffering block 62 of the damper 60 is sandwiched between a respective arm 42 of the first coupling member 40 and a corresponding arm 52 of the second coupling member 50. In addition, the radially outermost surface of the arms 52 of the second coupling member 50 abut against the inner surface of the sidewall 44 of the first coupling member 40.

As described above, the second coupling member 50 is entirely received in the first coupling member 40, such that the second coupling member 50 does not add additional axial length to the coupling device 10. Therefore, a total length of the coupling device 10 is shortened.

The thrust force transmitting member 70 is made of metal and has a cylindrical-shape. The thrust force transmitting member 70 is received in the blind hole 28 of the output shaft 20 with an axial end thereof abutting against the bottom of the blind hole. The mounting portion 32 of the input shaft 30 extends through the second coupling member 50 and abuts against an opposite axial end of the thrust force transmitting member 70 Thus, a thrust force can be transmitted between the input shaft 30 and the output shaft 20 via the thrust force transmitting member 70, without applying a force on the first and second coupling members 40, 50. It should be understood that the thrust force transmitting member 70 may be omitted if the input shaft 30 directly abuts against the output shaft 20 so that the thrust force can be transmitted directly there between.

Figure 5:
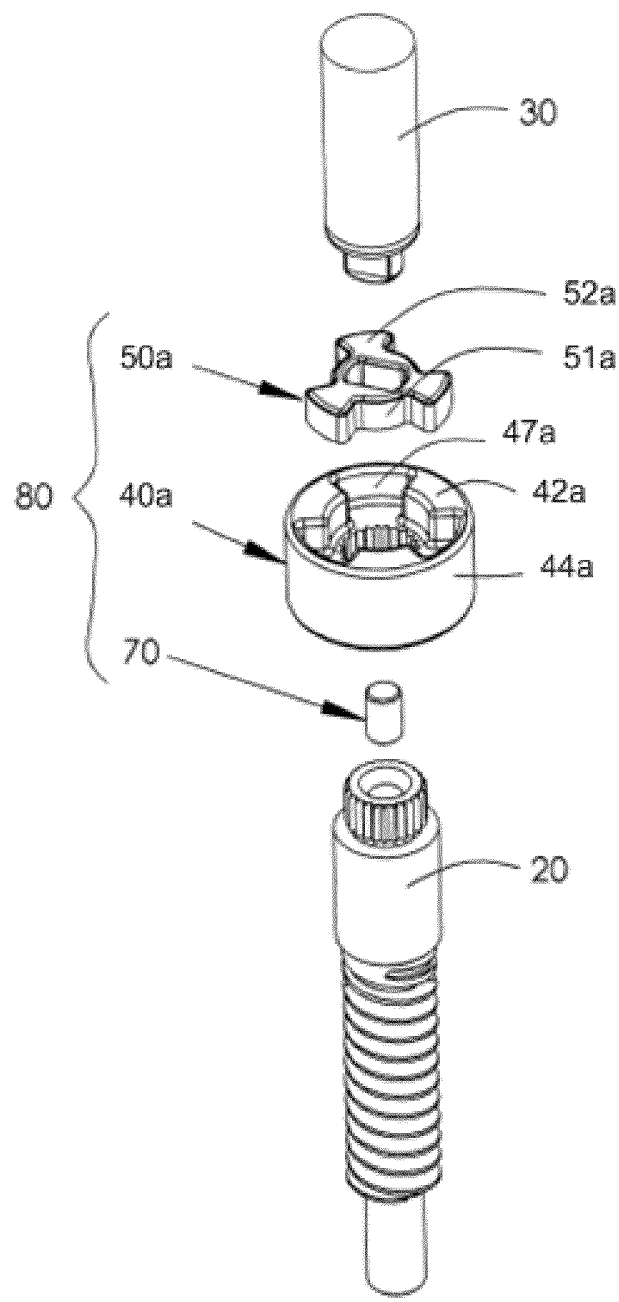
FIG. 5 shows a torque transmission assembly according to a second embodiment of the present invention.

Referring to FIG. 5, a coupling device 80 according to a second embodiment of the present invention is shown. The coupling device 80 differs from the coupling device 10 of the first embodiment in that, the damper is omitted. In this embodiment, the spaces 47a between two neighboring arms 42a each have a profile matching the arm 52a of the second coupling member 50a. The arms 52a of the second coupling member 50a are fittingly engaged in the receiving spaces 47a of the first coupling member 40a, and the arms 52a of the second coupling member 50a directly abut against the arms 42a of the first coupling member 40a in the circumferential direction of the coupling device 80. Thus, torque is transmitted between the first coupling member 40a and the second coupling member 50a directly.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items. The adverb "axially" relates to a direction along or parallel to an axis of the coupling device, and the adverb "radially" relates to a direction substantially along a radius of the coupling device.

The invention claimed is:

1. A coupling device configured for connecting a first shaft to a second shaft, the coupling device comprising:
   a first coupling member comprising a bottom wall having a mounting face at an axial end, and a plurality of arms extending axially from the mounting face of the bottom wall, the arms being circumferentially spaced from each other with a receiving space defined between each two neighboring arms;
   a second coupling member comprising a main body and a plurality of arms extending radially from an outer periphery of the main body, the arms of the second coupling member being circumferentially spaced from each other, each of the arms of the second coupling member being received in a respective receiving space of the first coupling member, whereby the first coupling member and the second coupling member rotate together; and
   a damper comprising a plurality of buffering blocks each of which is disposed between a respective arm of the first coupling member and a corresponding arm of the second coupling member adjacent to the arm of the first coupling member;
   wherein the first coupling member further comprises a cylindrical sidewall extending axially from a periphery of the bottom wall, and a radially outer end of each arm of the first coupling member adjoins an inner surface of the sidewall, and the radially outermost surfaces of the arms of the second coupling member abut against the inner surface of the sidewall of the first coupling member; and
   wherein the damper and the first coupling member are joined together by insert molding, the first coupling member and the damper form interlocking structures at interfaces between the arms of the first coupling member and the buffering blocks of the damper, each interlocking structure comprises a groove and a protrusion fittingly engaged in the groove.

2. The coupling device of claim 1, wherein the second coupling member is entirely received in the first coupling member.

3. The coupling device of claim 1, wherein the protrusions of the interlocking structure are wedge shaped, and the grooves have a corresponding wedge shaped profile.

4. The coupling device of claim 1, wherein the first coupling member defines an annular groove in an axially outer end surface of the bottom wall, the annular groove being connected to the receiving spaces of the first coupling member by through holes formed in the end wall, and the damper further comprises a bottom ring fittingly received in the annular groove and connected to the buffering blocks.

5. The torque transmission assembly of claim 4, wherein the damper further comprises a plurality of connecting bars received in the through holes, adjacent buffering blocks between adjacent arms of the second coupling member are connected to the bottom ring via one of the connecting bars.

6. A torque transmission assembly comprising:
a first shaft;
a second shaft; and
a coupling device for connecting the first shaft to the second shaft, the coupling device comprising:
a first coupling member fixed to rotate with the first shaft, the first coupling member comprising a bottom wall having a mounting face at an axial end, and a plurality of arms extending axially from the mounting face of the bottom wall, the arms being circumferentially spaced from each other with a receiving space defined between each two neighboring arms; and
a second coupling member arranged to rotate with the second shaft, the second coupling member comprising a main body and a plurality of arms extending radially from an outer periphery of the main body, the arms of the second coupling member being circumferentially spaced from each other, each of the arms of the second coupling member being received in a respective receiving space of the first coupling member, whereby the first coupling member and the second coupling member rotate together; and
a damper comprising a plurality of buffering blocks each of which is disposed between a respective arm of the first coupling member and a corresponding arm of the second coupling member adjacent to the arm of the first coupling member;
wherein the first coupling member further comprises a cylindrical sidewall extending axially from a periphery of the bottom wall, and a radially outer end of each arm of the first coupling member adjoins an inner surface of the sidewall, and the radially outermost surfaces of the arms of the second coupling member abut against the inner surface of the sidewall of the first coupling member; and
wherein the damper is molded to the first coupling member, the first coupling member and the damper form interlocking structures at interfaces between the arms of the first coupling member and the buffering blocks of the damper, each interlocking structure comprises a groove and a protrusion fittingly engaged in the groove.

7. The torque transmission assembly of claim 6, wherein the first coupling member is integrally formed on the first shaft by insert molding.

8. The torque transmission assembly of claim 7, wherein a plurality of teeth are formed at an interface between the first coupling member and the first shaft.

9. The torque transmission assembly of claim 6, wherein the second coupling member is entirely received in the first coupling member.

10. The torque transmission assembly of claim 6, wherein the protrusions of the interlocking structures are wedge shaped, and the grooves have a corresponding wedge shaped profile.

11. The torque transmission assembly of claim 6, wherein the first coupling member defines an annular groove in an axially outer end surface of the bottom wall, the annular groove being connected to the receiving spaces of the first coupling member by through holes formed in the end wall, and the damper further comprises a bottom ring fittingly received in the annular groove and connected to the buffering blocks.

12. The torque transmission assembly of claim 11, wherein the damper further comprises a plurality of connecting bars received in the through holes, adjacent buffering blocks between adjacent arms of the second coupling member are connected to the bottom ring via one of the connecting bars.

13. The torque transmission assembly of claim 6, wherein the first shaft comprises a connecting section fixed to the first coupling member and a stop section close to the connecting section and having a diameter larger than that of the connecting section.

14. A torque transmission assembly comprising:
a first shaft;
a second shaft; and
a coupling device for connecting the first shaft to the second shaft, the coupling device comprising:
a first coupling member fixed to rotate with the first shaft, the first coupling member comprising a bottom wall having a mounting face at an axial end, and a plurality of arms extending axially from the mounting face of the bottom wall, the arms being circumferentially spaced from each other with a receiving space defined between each two neighboring arms;
a second coupling member arranged to rotate with the second shaft, the second coupling member comprising a main body and a plurality of arms extending radially from an outer periphery of the main body, the arms of the second coupling member being circumferentially spaced from each other, each of the arms of the second coupling member being received in a respective receiving space of the first coupling member, whereby the first coupling member and the second coupling member rotate together; and
a thrust force transmitting member, wherein the first shaft defines a blind hole, the thrust force transmitting member is received in the blind hole with an axial end thereof abutting against a bottom of the blind hole, and an axial end of the second shaft extends through the second coupling member and abuts against an opposite axial end of the thrust force transmitting member.

15. The torque transmission assembly of claim 14, wherein the thrust force transmitting member is cylindrical with the two axial end surfaces thereof abutting against the bottom of the blind hole and the axial end of the second shaft respectively.

16. The torque transmission assembly of claim 14, wherein the first coupling member further comprises a cylindrical sidewall extending axially from a periphery of the bottom wall, and a radially outer end of each arm of the first coupling member adjoins an inner surface of the sidewall, the radially outermost surfaces of the arms of the second coupling member abut against the inner surface of the sidewall of the first coupling member.

17. The torque transmission assembly of claim 14, wherein the first shaft comprises a connecting section fixed to the first coupling member and a stop section close to the connecting section and having a diameter larger than that of the connecting section.

18. The torque transmission assembly of claim 14, wherein the coupling device further comprises a damper, the damper comprises a plurality of buffering blocks each of which is disposed between a respective arm of the first coupling member and a corresponding arm of the second coupling member adjacent to the arm of the first coupling member.

19. The torque transmission assembly of claim 18, wherein the first coupling member defines an annular groove in an axially outer end surface of the bottom wall, the annular groove being connected to the receiving spaces of the first coupling member by through holes formed in the end wall; and the damper further comprises a bottom ring fittingly received in the annular groove and connected to the buffering blocks.

20. The torque transmission assembly of claim 19, wherein the damper further comprises a plurality of connecting bars received in the through holes, adjacent buffering blocks between adjacent arms of the second coupling member are connected to the bottom ring via one of the connecting bars; the damper is molded to the first coupling member.

21. A coupling device configured for connecting a first shaft to a second shaft, the coupling device comprising:
   a first coupling member comprising:
      a bottom wall having a mounting face and an outer end surface at two opposing axial sides thereof;
      a plurality of arms extending axially from the mounting face of the bottom wall, and circumferentially spaced from each other with a receiving space defined between two neighboring arms;
      a plurality of through holes axially formed in the bottom wall; and
      an annular groove in the outer end surface of the bottom wall and communicating with the plurality of receiving spaces by the through holes;
   a second coupling member comprising:
      a main body having an outer periphery; and
      a plurality of arms extending radially from the outer periphery of the main body and circumferentially spaced from each other, wherein each of the arms of the second coupling member is received in a corresponding receiving space of the first coupling member, whereby the first coupling member and the second coupling member rotate together; and
   a damper comprising:
      a plurality of buffering blocks each of which is disposed between a respective arm of the first coupling member and a corresponding arm of the second coupling member adjacent to the respective arm of the first coupling member; and
      a bottom ring fittingly received in the annular groove in the outer end surface of the bottom wall of the first coupling member and connected to the plurality of buffering blocks.

22. The torque transmission assembly of claim 21, wherein the damper further comprises a plurality of connecting bars received in the through holes, adjacent buffering blocks between adjacent arms of the second coupling member are connected to the bottom ring via one of the connecting bars; the damper is molded to the first coupling member.

\* \* \* \* \*